(12) United States Patent
Koyama

(10) Patent No.: US 6,705,874 B1
(45) Date of Patent: Mar. 16, 2004

(54) COLORED MAGNETIC PARTICLES FOR MAGNETOPHORETIC DISPLAY AND METHOD FOR MANUFACTURING SAME

(75) Inventor: Akihiro Koyama, Chiba (JP)

(73) Assignees: Marktec Corporation, Tokyo (JP); Takara Co., Ltd, Tokyo (JP)

( * ) Notice: Subject to any disclaimer, the term of this patent is extended or adjusted under 35 U.S.C. 154(b) by 0 days.

(21) Appl. No.: 09/685,505

(22) Filed: Oct. 10, 2000

(30) Foreign Application Priority Data

Dec. 3, 1999 (JP) .......................... 11-345428

(51) Int. Cl.$^7$ ................................. B43L 1/00
(52) U.S. Cl. .................. 434/409; 40/449; 427/127; 428/116; 428/117; 434/408
(58) Field of Search ................. 434/408, 409, 434/365; 427/242, 127, 128, 129, 130, 131, 132; 345/86, 111; 40/449; 428/117, 119, 692, 900; 346/135.1, 21

(56) References Cited

U.S. PATENT DOCUMENTS

| | | | |
|---|---|---|---|
| 3,573,979 A | * | 4/1971 | Honjo ........................ 427/127 |
| 3,922,687 A | * | 11/1975 | Trimble et al. ............. 346/74.1 |
| 4,368,952 A | * | 1/1983 | Murata et al. .............. 350/362 |
| 4,724,094 A | * | 2/1988 | Song ........................ 252/62.52 |
| 5,151,032 A | * | 9/1992 | Igawa ........................ 434/409 |
| 5,295,837 A | * | 3/1994 | Gilano et al. ............... 434/409 |
| 5,846,630 A | * | 12/1998 | Tazaki et al. ................. 428/68 |
| 5,997,309 A | * | 12/1999 | Metheny et al. ............. 434/409 |
| 6,048,574 A | * | 4/2000 | Atarashi et al. ............. 427/127 |
| 6,196,848 B1 | | 3/2001 | Yamazaki |

FOREIGN PATENT DOCUMENTS

| | | |
|---|---|---|
| EP | 994455 | 4/2000 |
| GB | 2343384 | 3/1999 |
| JP | 4237028 | 8/1992 |
| JP | 11115379 | 4/1999 |
| JP | 11-115379 | * 4/1999 |
| JP | 11-312605 | * 11/1999 |

* cited by examiner

*Primary Examiner*—Derris H. Banks
*Assistant Examiner*—Dmitry Suhol

(57) ABSTRACT

Colored magnetic particles for magnetophoretic display capable of substantially preventing peeling of a pigment therefrom, to thereby prevent contamination of a dispersion medium during use of a magnetophoretic display panel, and a method for manufacturing the same. The colored magnetic particles include magnetic particle elements and a coloring layer formed on each of the magnetic particle elements from a first dispersion liquid using a coating apparatus of a tumbling, fluidizing and granulating type, to thereby color each of the magnetic particles. The first dispersion liquid is constituted of a coloring pigment, synthetic resin and water. The synthetic resin is in the form of an aqueous emulsion. The colored magnetic particles each include a protective layer formed on the coloring layer. The protective layer is formed from a second dispersion liquid constituted of synthetic resin dispersed in water.

26 Claims, 4 Drawing Sheets

COLORED MAGNETIC PARTICLES FOR MAGNETOPHORETIC DISPLAY AND METHOD FOR MANUFACTURING SAME

BACKGROUND OF THE INVENTION

This invention relates to colored magnetic particles for magnetophoretic display and a method for manufacturing the same, and more particularly to colored magnetic particles used for a magnetophoretic display panel which is adapted to carry out display using magnetophoresis or magnetic migration and a method for manufacturing such colored magnetic particles.

A magnetic drawing panel which has been conventionally known as a picture drawing board for infants in the art is generally constructed in such a manner that a honeycomb core formed with a number of hexagonal cells is sealedly arranged between a transparent or semitransparent drawing plate or base plate and a face member arranged opposite to the drawing plate and the cells each have a plastic dispersion liquid which contains magnetic particles sealedly received therein.

In the conventional magnetic drawing panel thus constructed, a magnet pen is brought into contact at a tip end thereof with a drawing surface of the panel, to thereby permit a magnetic field to act on the plastic dispersion liquid, resulting in the magnetic particles rising to the drawing surface, so that a desired picture or character may be displayed on the drawing surface due to contrast between a dispersion medium for the dispersion liquid and the magnetic particles. Also, movement of an erasing bar sildably arranged under the face member permits the magnetic particles which have risen to sink in the dispersion liquid, to thereby erase the picture or character displayed.

The plastic dispersion liquid conventionally used for this purpose is generally obtained by compounding magnetic particles, a thickener containing fine particles and a coloring agent in a dispersion medium. The dispersion medium may be selected from the group consisting of, for example, polar dispersion mediums such as water, glycols and the like and non-polar dispersion mediums such as organic solvents, oils and the like. The magnetic particles may be selected from the group consisting of particles of magnetic oxide materials such as black magnetite, γ-hematite, chromium dioxide, ferrite and the like and particles of magnetic metal materials such as alloys of iron, cobalt, nickel and the like. The fine particle thickener may be selected from the group consisting of finely divided silicate such as silicic acid anhydride, hydrous calcium silicate, hydrous aluminum silicate, silica powder, diatomaceous earth, kaolin, clay, bentonite or a mixture thereof; alumina; ultra fine calcium carbonate; ultra fine activated calcium carbonate; ground calcium carbonate; hydrous basic magnesium carbonate; barium sulfate; and the like. The coloring agent may be selected from the group consisting of a white pigment, a colored pigment, a dye and the like. Use of the plastic dispersion liquid permits a figure, a character or the like to be displayed on the drawing surface due to contrast between a ground color of the white or opaque white dispersion medium and a line drawn by the black magnetic particles.

As a new display panel following the above-described magnetophoretic display device wherein a black line is drawn on a white ground, it is desired to develop a magnetophoretic display device which is constructed so as to exhibit color display. The inventor as well made a study of realizing such a color magnetophoretic display panel. Techniques which have been conventionally proposed for this purpose include techniques of coloring a metal powder, grinding techniques and spray drying techniques.

The grinding techniques are constructed so as to mix iron powder as magnetic particles, a pigment and synthetic resin with each other to prepare a mixed material, dry the material and grinding it to form it into particles having a uniform particle diameter. The grinding techniques permit the material to have a bright color. However, the techniques cause the pigment to be peeled from the material during the grinding step, to thereby produce fine powder, leading to contamination of a dispersion liquid. The spray drying techniques include the step of mixing iron powder as magnetic particles a pigment and synthetic resin together to prepare a liquid mixture and the step of spraying the mixture in a hot air atmosphere to form particles of a required particle diameter. Thus, the spraying techniques are free from any grinding step, to thereby eliminate peeling of the pigment from each of the particles due to the grinding. However, the spraying techniques cause peeling of the pigment from the particles due to striking of the particles against air during the spraying. Further, they cause the pigment peeled from the particles to form undesired particles.

Also, even when the prior art permits colored magnetic particles which prevents peeling of the pigment from the particles during manufacturing thereof to be provided, the colored magnetic particles thus provided cause a coloring layer to be gradually peeled from each of the particles when they are sealedly received together with a plastic dispersion liquid in a magnetophoretic display panel, because the magnetic particles collide with each other during repeating of rising and sinking thereof in the dispersion liquid during use of the magnetophoretic display panel. This results in the coloring pigment peeled from the coloring layer dissolving in the dispersion medium over a long period of time, leading to contamination of the dispersion medium.

SUMMARY OF THE INVENTION

The present invention has been made in view of the foregoing disadvantage of the prior art.

Accordingly, it is an object of the present invention to provide colored magnetic particles for magnetophoretic display which are capable of substantially preventing peeling of a coloring pigment from magnetic particle elements.

It is another object of the present invention to provide colored magnetic particles for magnetophoretic display which are capable of preventing contamination of a dispersion medium.

It is a further object of the present invention to provide an improved method for manufacturing said colored magnetic particles for magnetophoretic display.

In accordance with one aspect of the present invention, colored magnetic particles for magnetophoretic display which are contained in a plastic dispersion liquid for a magnetophoretic display panel are provided. The colored magnetic particles include: magnetic particle elements; a coloring layer formed on each of the magnetic particle elements from a first dispersion liquid using a coating apparatus of a tumbling, fluidizing and granulating type, to thereby color each of the magnetic particles, the first dispersion liquid being constituted of a coloring pigment, synthetic resin and water, the synthetic resin being in the form of an aqueous emulsion; and a protective layer formed on the coloring layer, the protective layer being formed from a second dispersion liquid constituted of synthetic resin dispersed in water.

In a preferred embodiment of the present invention, each of the colored magnetic particles further includes a white primary coat formed under the coloring layer, wherein the white primary coat is formed from a third dispersion liquid constituted of titanium white, synthetic resin and water on each of the magnetic particle elements by spraying the third dispersion liquid in the form of mist-like droplets in the coating apparatus.

In a preferred embodiment of the present invention, the colored magnetic particles contain the magnetic particle elements of 75 to 77 wt %, the pigment of 13 to 14 wt % and the synthetic resin of 9 to 10 wt %.

In a preferred embodiment of the present invention, the colored magnetic particles have a saturation magnetization of 80 to 150 emu/g and a magnetization, when a magnetic field of 1 kOe is applied thereto, of 35 to 65 emu/g.

In a preferred embodiment of the present invention, 90 wt % or more of the colored magnetic particles have a particle diameter of 50 µm to 130 µm.

In a preferred embodiment of the present invention, the magnetic particle elements have an apparent density of 2.3 to 3.0 g/cm$^3$ and a saturation magnetization of 130 to 200 emu/g.

In accordance with another aspect of the present invention, a method for manufacturing colored magnetic particles for magnetophoretic display which are contained in a plastic dispersion liquid for a magnetophoretic display panel is provided. The method includes the steps of: forming a coloring layer on each of magnetic particle elements from a first dispersion liquid using a coating apparatus of a tumbling, fluidizing and granulating type, to thereby color each of the magnetic particles, the first dispersion liquid being constituted of a coloring pigment, synthetic resin and water, the synthetic resin being in the form of an aqueous emulsion; and forming a protective layer on the coloring layer, the protective layer being formed from a second dispersion liquid constituted of synthetic resin dispersed in water.

In a preferred embodiment of the present invention, the method further includes the step of forming, prior to the forming step of the coloring layer, a white primary coat from a third dispersion liquid constituted of titanium white, synthetic resin and water on each of the magnetic particle elements.

In a preferred embodiment of the present invention, the forming of the coloring layer is carried out by spraying the first dispersion liquid in the form of mist-like droplets in the coating apparatus.

In a preferred embodiment of the present invention, the forming of the protective layer is carried out by spraying the second dispersion liquid in the form of mist-like droplets in the coating apparatus.

In a preferred embodiment of the present invention, the forming of the white primary coat is carried out by spraying the third dispersion liquid in the form of mist-like droplets in the coating apparatus.

In a preferred embodiment of the present invention, the first dispersion liquid is coated on the magnetic particle elements at a product temperature lower than a glass-transition temperature of the synthetic resin.

In a preferred embodiment of the present invention, the magnetic particle elements have an apparent density of 2.3 to 3.0 g/cm$^3$ and a saturation magnetization of 130 to 200 emu/g.

In a preferred embodiment of the present invention, the pigment has a particle diameter of between 0.01 µm and 6 µm.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
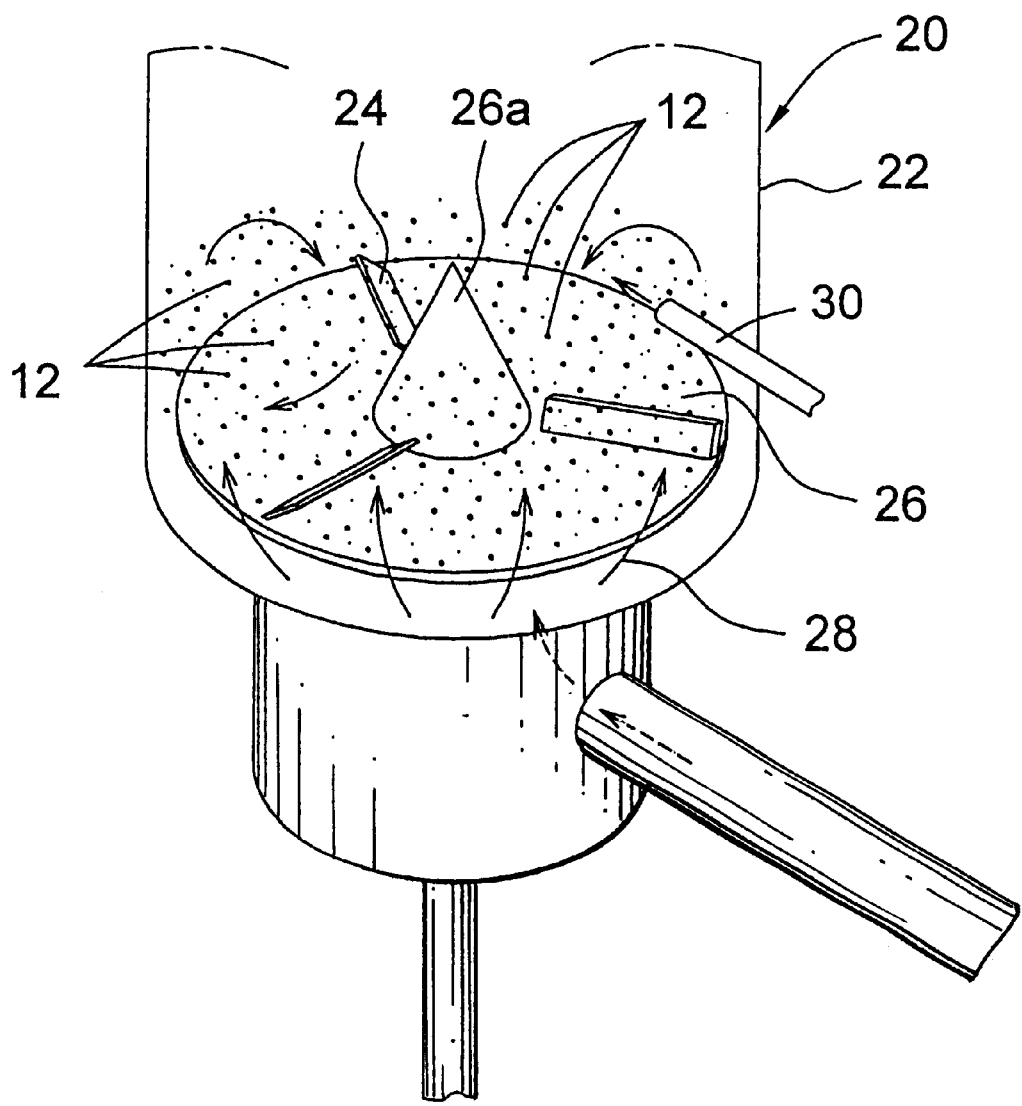
FIG. 1 is a perspective view showing a coating apparatus of a tumbling, fluidizing and granulating type which is suitable for use for manufacturing of colored magnetic particles according to the present invention.

Now, colored magnetic particles for magnetophoretic display and a method for manufacturing the same according to the present invention will be described with reference to the accompanying drawings.

Colored magnetic particles for magnetophoretic display according to the present invention which are used for a magnetophoretic display panel are generally constituted of magnetic particle elements, a pigment and synthetic resin.

The magnetic particle elements may be made of a silicon steel material or a stainless steel material. More specifically, stainless steel materials such as SUS 343, SUS 343L, SUS 405, SUS 410L, SUS 430, SUS 434, SUS 329J1 and the like may be suitably used for this purpose. The magnetic particle elements preferably have an apparent density of 2.3 to 3.0 g/cm$^3$ and a saturation magnetization of 130 to 200 emu/g before they are subjected to coloring. An optimum value of the saturation magnetization may be set at 130 to 160 emu/g. Also, a magnetic material made of an oxide magnetic material or a magnetic material made of metal (metal magnetic material) may be used for this purpose as in the prior art. The oxide magnetic materials include black magnetite, γ-hematite, chromium dioxide, ferrite and the like. The metal magnetic materials include alloys of iron, cobalt and nickel. The magnetic particle elements may have a diameter of from 40 µm to 100 µm.

The pigments used for coloring the magnetic particle elements include, for example, a red pigment, a yellow pigment, a blue pigment, a green pigment, and a mixture of the blue and yellow pigments. The red pigments include permanent red, fast red, pigment red, brilliant carmine, tinting red, red oxide and the like. The yellow pigments include fast yellow, pigment yellow, pigment orange, acid yellow, Hansa yellow, yellow oxide and the like. The blue pigments include cyanine blue, cobalt blue, Prussian blue, ultramarine blue and the like. The green pigments include phthalocyanine green, pigment green, cobalt green and the like. However, pigments suitable for use in the present invention are not limited to such organic and inorganic coloring pigments as described above. Thus, a resin color which may be prepared by grinding a colored resin material may be suitably used to this end.

A presence of only the pigment fails to permit secure fixing of the pigment onto each of the magnetic particle elements. Thus, the synthetic resin briefly described above is added to the coloring pigment, to thereby be mixed therewith, resulting in reliable fixing of the pigment onto the magnetic particle element being ensured.

The synthetic resin is in the form of an aqueous emulsion wherein water is used as a dispersion medium. The emulsions may include acrylic ester emulsion resin, acrylic copolymer emulsion, acrylic styrene copolymer emulsion, vinyl acetate emulsion and the like. Now, the reason why the aqueous emulsion is used will be described hereinafter. When solvent soluble resin is to be dissolved in a solvent, it is required to arrange an explosion-proof facility and a solvent recovering plant, leading to an increase in manufacturing cost of the colored magnetic particles. Also, dissolution of water soluble resin in water may be carried out using the same facility as used in preparation of the aqueous emulsion. However, such resin is hygroscopic, resulting in it being unsuitable for use for this purpose in practice. Further, the solvent soluble resin and water soluble resin each exhibit an increased viscosity or stickiness after the solvent or water is evaporated from the resin, to thereby cause the magnetic particle elements to readily agglomerate or coalesce together. On the contrary, the emulsion kept at a low temperature of 40° C. or less permits coating of the emulsion on the magnetic particle elements while reducing a viscosity or stickiness thereof. It was found that the resin contained in the emulsion has a glass-transition temperature of 40° C., so that coating of the emulsion at a temperature of about 30° C. may prevent coalescence or agglomeration of the magnetic particle elements.

In the illustrated embodiment, strength of magnetization is adjusted so as to permit a coloring layer to be satisfactorily formed on the magnetic particle elements. For this purpose, a content of the magnetic particle elements is 75 to 77 wt % and the balance is constituted of the pigment and synthetic resin. Contents of the pigment and synthetic resin constituting the balance are 13 to 14 wt % and 9 to 10 wt %, respectively. Such pigment and synthetic resin include a pigment for a white primary coat described below and synthetic resin for a protective layer described below, respectively.

Figure 2:
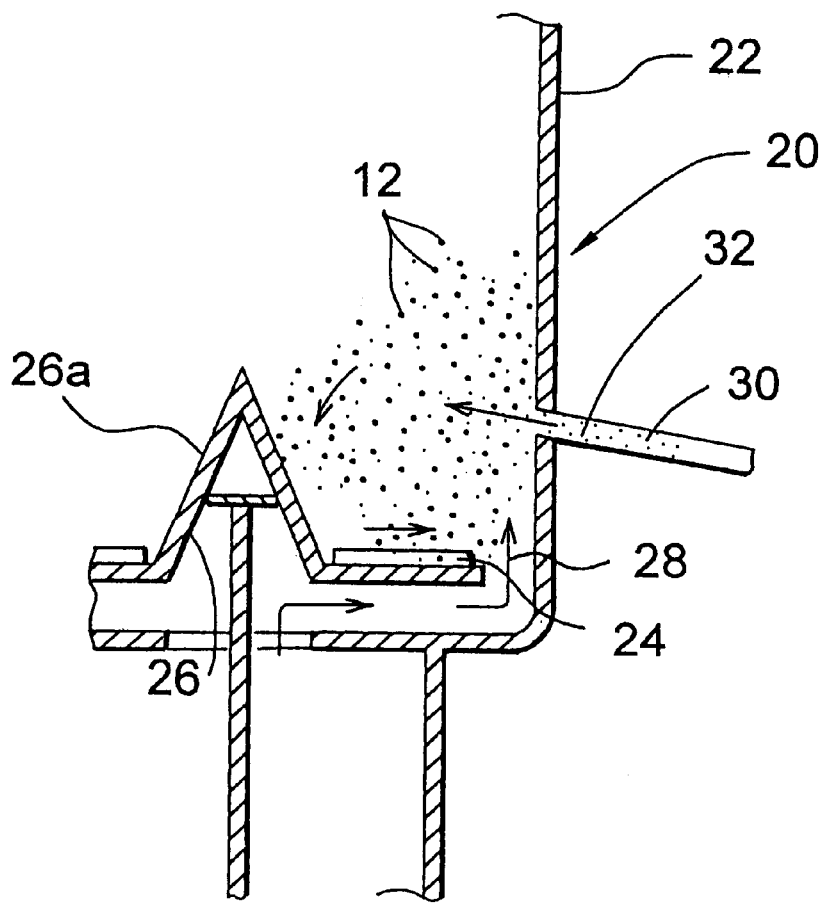
FIG. 2 is a fragmentary sectional view of the coating apparatus of a tumbling, fluidizing and granulating type shown in FIG. 1.

For manufacturing of the colored magnetic particles, a half of the synthetic resin, the color pigment and water are combined with each other to form a dispersion having a solid content of 30 to 50%. Then, the dispersion is subjected to granulation by means of a coating apparatus 20 of a tumbling, fluidizing and granulating type which is constructed as shown in FIGS. 1 and 2. The solid content below 30% causes much time to be required for the granulation, leading to a deterioration in efficiency and peeling of the pigment from the magnetic particle elements. Whereas, the solid content above 50% leads to a disadvantageous increase in viscosity, to thereby cause an increase in size of mist-like droplets of the dispersion sprayed, resulting in undesired coalescence of the magnetic particle elements being apt to occur.

Figure 3:
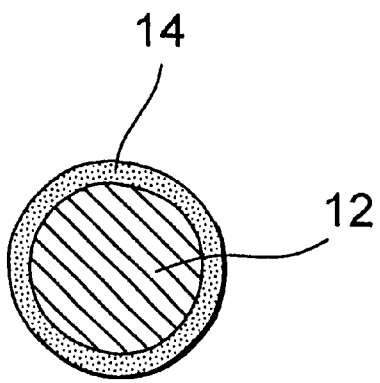
FIG. 3 is an enlarged sectional view showing a magnetic particle which has a coloring layer formed thereon according to the present invention.

First of all, magnetic particle elements 12 are charged in a fluid tank 22 which is provided at a bottom thereof with a rotor 26 equipped with blades 24. Flowing air (hot air) 28 is fed into the fluid tank 22 through a gap defined between an outer periphery of the bladed rotor 26 and a side wall of the apparatus 20, so that the magnetic particle elements 12 may be substantially subjected to a tumbling and compacting treatment by cooperation between the blades 24 and the rotor 26. Then, a dispersion liquid 32 prepared by mixing the above-described synthetic resin, pigment and water with each other is sprayed in the form of mist-like droplets from a nozzle 30 when the magnetic particle elements 12 are moved to the outer periphery of the rotor 26 by tumbling, so that the magnetic particle elements 12 may be coated with the dispersion liquid. This results in the magnetic particle elements 12 being blown up to an upper central region in the fluid tank 22 while being carried on the dispersion liquid 32 and then circulated along a tapered portion of a central cone section 26a on the rotor 26. Such a process is repeated in order of wetting the magnetic particle elements with the dispersion liquid, permitting the wetted elements to adsorb the dispersion liquid thereon, forming each of the elements into a spherical shape by compacting and then solidifying the magnetic particle elements by drying. This leads to granulation of the magnetic particle elements formed thereon with a colored layer, so that colored magnetic particles each constituted of a respective one of the magnetic particle elements 12 and a coloring layer 14 thus formed on the magnetic particle element 12 may be obtained as shown in FIG. 3.

The coating apparatus 20 of a tumbling, fluidizing and granulating type constructed as described above permits the granulation to be advanced while keeping a content of moisture in ingredients for the colored magnetic particles at a high level, so that the colored magnetic particles may be prepared in a relatively short period of time. The granulation is proceeded while the magnetic particle elements are kept half-dried by being drawn in a swirl formed by tumbling of the magnetic particle elements, so that the coloring pigment in the form of a fine powder may be adhered to a surface of each of the magnetic particle elements, to thereby minimize residue of the fine powder of the coloring pigment, so that a particle size distribution of the colored magnetic particles may be rendered sharp. Thus, adjustment of a balance between wetting and drying permits density of the colored magnetic particles to be controlled.

The coloring pigment preferably has a particle diameter of between 0.01 $\mu$m and 6 $\mu$m. The particle diameter below 0.01 $\mu$m causes fine powder which contaminates the dispersion medium during manufacturing of the colored magnetic particles to be readily produced and the particle diameter above 6 $\mu$m fails to permit the colored magnetic particles to exhibit satisfactory chroma. The particle size of the coloring pigment particularly suitable for ensuring satisfactory chroma of the colored magnetic particles is within a range of between 0.1 $\mu$m and 4 $\mu$m.

As described above, the coating apparatus of a tumbling, fluidizing and granulating type permits the coloring pigment to be uniformly coated on each of the magnetic particle elements. This permits the colored magnetic particles to be uniform in particle diameter and magnetization thereof to be averaged, so that the colored magnetic particles may exhibit a satisfactory color, leading to an increase in chroma.

Also, the above-described coating permits the granulation to be proceeded while keeping the magnetic particle elements drawn in a swirl formed by tumbling of the magnetic particle elements, resulting in residue of the fine powder being minimized. This effectively prevents contamination of the dispersion medium contained in each of cells of a magnetophoretic display panel.

Of blue, red, green and yellow colors, green and blue colors can be rendered brilliant or bright. However, it is not possible to render red and yellow colors brilliant or bright. This is for the reason that the magnetic particle elements 12 made of stainless steel are gray; thus, in the case of coating the dispersion liquid on the magnetic particle elements 12 acting as a substrate, dark colors or colors reduced in brightness such as green and blue colors are hard to be affected by a color of the substrate, whereas bright colors or colors increased in brightness are readily darkened because of causing the substrate or each of the magnetic particle elements to be seen therethrough.

Figure 4:
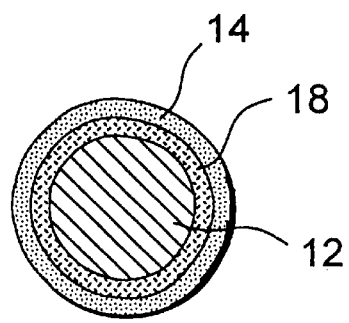
FIG. 4 is an enlarged sectional view showing another example of a magnetic particle which has a coloring layer formed thereon according to the present invention in which a white primary coat is formed.

In view of the above, in connection with the red and yellow colored magnetic particles, the illustrated embodiment may be preferably constructed in such a manner that a dispersion liquid is made of titanium white (titanium dioxide) in an amount of 7 wt % acting as a white pigment which is a part of the above-described pigment in an amount of 13 to 14 wt %, synthetic resin in an amount of 1 wt % which is a part of the above-described synthetic resin in an amount of 9 to 10 wt % and water so that a solid content in an amount of 30 to 50% is dispersed therein. Then, the dispersion liquid thus formed is sprayed in the form of mist-like droplets on the magnetic particle elements in the coating apparatus to form a white primary coat on the magnetic particle elements. Subsequently, a red or yellow dispersion liquid is preferably coated on the thus-formed white primary coat. In this instance, as shown in FIG. 4, a white primary coat 18 is formed on each of the magnetic particle elements 12 and then the coloring layer 14 is formed on the white primary coat 18. In the blue and green colored magnetic particles as well, such a white primary coat is preferably formed between each of the magnetic particle elements and the coloring layer formed of the pigment.

Figure 5A:
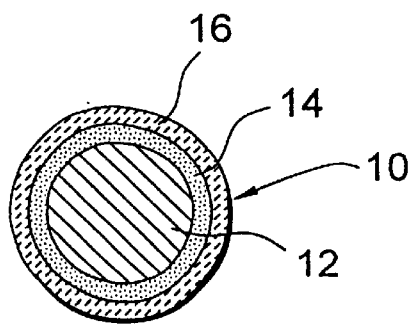
FIGS. 5A and 5B are enlarged sectional views respectively showing embodiments of colored magnetic particles for magnetophoretic display according to the present invention in which a protective layer is further formed.
Figure 5B:
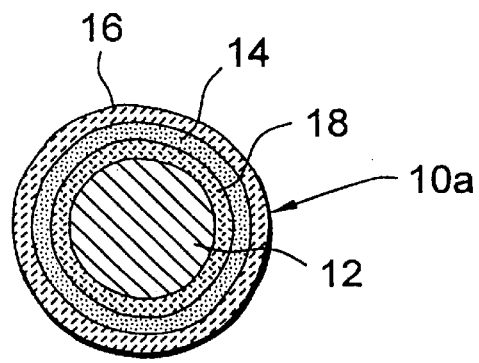

Coating of all of the dispersion liquid constituted of the pigment and synthetic resin under the same conditions often causes the coloring layer made of the pigment to be peeled in a small amount from the substrate or each of the magnetic particle elements depending on operating conditions. Thus, in view of ease of the coating and whole strength of the colored magnetic particles, it is preferable that the other half of the synthetic resin previously reserved be dispersed in water to form a dispersion liquid which has a solid content of from 20% to 30%. Then, the dispersion liquid is sprayed in the form of mist-like droplets on the magnetic particle elements in the coating apparatus described above, to thereby carry out overcoating thereon. The solid content below 20% causes much time to be required for manufacturing of the colored magnetic particles, leading to a deterioration in manufacturing efficiency, whereas the solid content above 30% causes the dispersion liquid to be excessively increased in stickiness, resulting in coalescence of the magnetic particle elements readily occurring. Such overcoating, as shown in FIGS. 5A and 5B, permits a protective layer 16 made of synthetic resin to be formed on the coloring layer 14 formed on each of the magnetic particle elements 12, so that the protective layer 16 may effectively prevent the coloring layer 14 from being peeled from the magnetic particle element 12. In particular, repeating of rising and sinking of the colored magnetic particles 10 or 10a during use of a magnetophoretic display panel causes the magnetic particles 10 or 10a to collide with each other, so that the coloring layer 14 is peeled from each of the magnetic particles 12 little by little and dissolved in a dispersion medium received in the display panel over a long period of time. This results in the dispersion medium being contaminated by the coloring layer material thus dissolved therein. In the illustrated embodiment, the protective layer 16 minimizes peeling of the coloring layer 14 from the magnetic particle 12, to thereby substantially prevent contamination of the dispersion medium, resulting in clear display of the magnetophoretic display panel over a long period of time being ensured.

The overcoating is desirably formed in an amount of 10 wt % or less based on the whole colored magnetic particles. The amount above 10 wt % causes the coloring layer to be relatively reduced in thickness, to thereby reduce chroma thereof although it leads to an increase in peel strength of the coloring layer. In view of relationship between the peel strength and the chroma, an optimum value of the amount may be set to be from 3 to 6 wt %.

Figure 6:
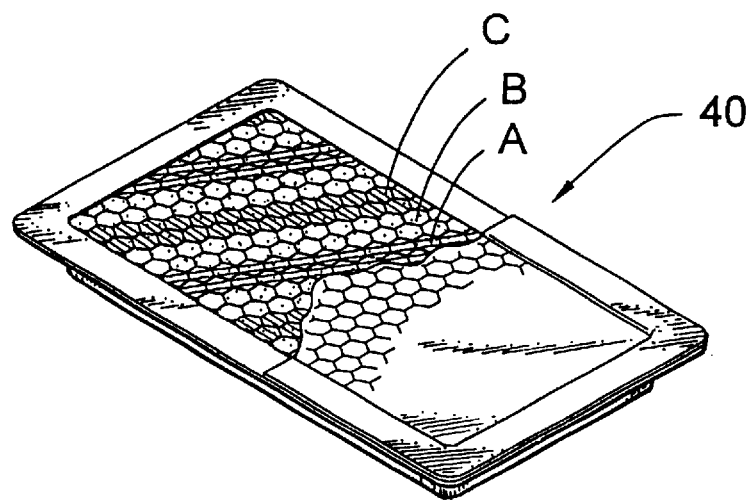
FIG. 6 is a perspective view showing a magnetophoretic display panel in which colored magnetic particles according to the present invention are incorporated.

The colored magnetic particles 10 or 10a of the illustrated embodiment constructed as described above are charged in a honeycomb core of a predetermined shape together with a plastic dispersion liquid prepared by compounding a particulate thickening agent and a coloring agent in a polar dispersion medium such as water, glycol or the like or a non-polar dispersion medium such as an organic solvent, oils or the like. Then, a panel member is attached to each of front and rear surfaces of the honeycomb core, resulting in such a magnetophoretic display panel 40 as shown in FIG. 6 being completed. Cells of the honeycomb or cell groups A, B, C, . . . each including a plurality of cells may be charged therein with the colored magnetic particles 10 different in color, respectively.

Figure 7:
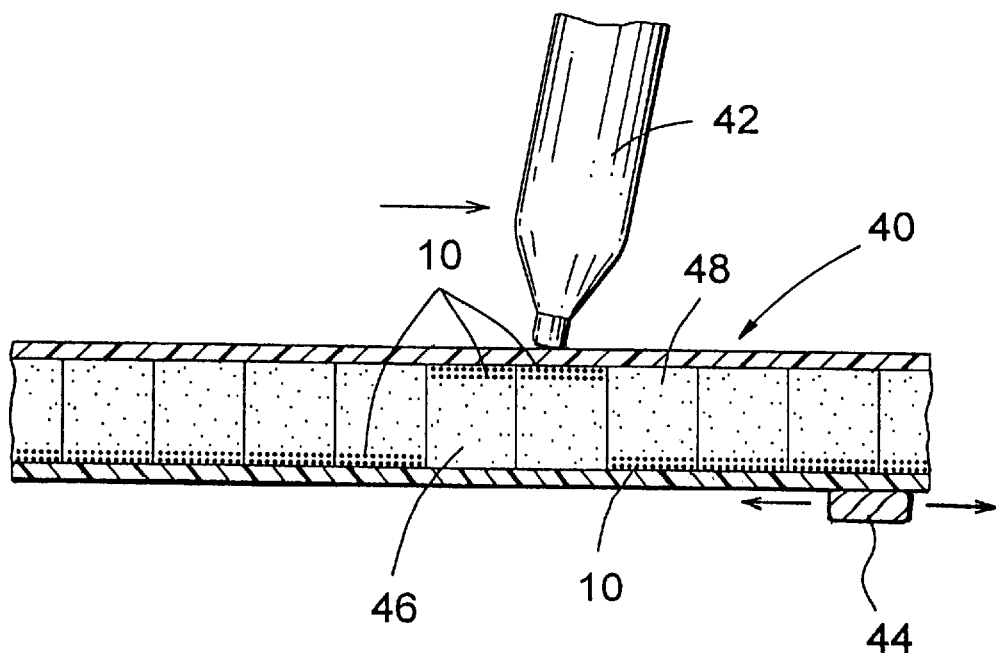
FIG. 7 is a sectional view showing operation of the magnetophoretic display panel of FIG. 6.

Now, the manner of operation of the magnetophoretic display panel 40 thus constructed will be described with reference to FIG. 7.

When a pen magnet 42 is moved on a drawing surface of the magnetophoretic display panel 40 of the type constructed as described above while being in contact at a tip end thereof with the drawing surface or when an erasing bar 44 slidably arranged on a rear surface of the panel 40 is laterally moved, a magnetic field is permitted to act on a plastic dispersion liquid 46. This permits colored magnetic particles 10 to rise to the drawing surface or sink so as to be away from the drawing surface, resulting in any desired picture or character being drawn on the drawing surface or erased therefrom. As described above, the colored magnetic particles 10 are prevented from contaminating a dispersion medium 48, resulting in them exhibiting a distinct color increased in chroma when they rise to the drawing surface, to thereby realize multi-coloring of the magnetophoretic display panel.

A saturation magnetization of the magnetic particle elements when they have been colored is preferably 80 to 150 emu/g. Also, a magnetization of the colored magnetic particles obtained when a magnetic field of 1 kOe, which approximates a magnetic field strength exhibited during operation of the magnetophoretic display panel 40 by means of the pen magnet 42 is applied thereto is desirably 35 to 65 emu/g as measured using a vibration sample-type magnetometer (Model VSM2 manufactured by TOEI INDUSTRY CO., LTD.) while applying a magnetic field of 1 kOe thereto. This permits the pen magnet 42 to satisfactorily rise or sink the colored magnetic particles 10. The magnetization below 35 emu/g causes rising or sinking of the colored magnetic particles 10 to be slow and a color displayed to be light or dull, whereas the magnetization above 65 emu/g causes the colored magnetic particles 10 in the cells adjacent to the cells which are in contact with the pen magnet 42 as well as the colored magnetic particles 10 in the latter cells to likewise rise, so that a line drawn is disadvantageously formed on side ends thereof with fine whisker-like projections and/or broken lines. An optimum value of the magnetization is 40 to 55 emu/g.

Also, 90 wt % or more of the colored magnetic particles completed preferably have a particle diameter of 50 to 130 $\mu$m. A particle diameter of the colored magnetic particles within a range of between 50 $\mu$m and 130 $\mu$m ensures that operation of coating the coating agent is most efficiently attained and a clear line is drawn. The particle diameter below 50 $\mu$m causes the number of colored magnetic particles in each of the cells to be excessive, resulting in the colored magnetic particles failing to rapidly respond to movement of the pen magnet. The particle diameter above 130 $\mu$m causes the number of colored magnetic particles in each of the cells to be disadvantageously reduced and a line drawn to be rough. Further, when the amount of colored magnetic particles distributed within the above-described particle diameter range is below 90 wt %, the magnetophoretic display panel fails to permit a clear line to be drawn on the drawing surface because the particles are not uniform in size.

As can be seen from the foregoing, the present invention is so constructed that the synthetic resin constituting the dispersion liquid is in the form of an aqueous emulsion. Such construction permits the coating to be attained while reducing a viscosity or stickiness of the dispersion liquid, to thereby substantially prevent the magnetic particle elements from coalescing together and the coloring layer from being peeled therefrom.

Also, according to the present invention, the colored magnetic particles each include the protective layer made from the dispersion liquid having the synthetic resin dispersed in water and formed on the coloring layer. Such construction effectively prevents peeling of the coloring layer from each of the magnetic particle elements when the colored magnetic particles collide with each other during repeating of rising and sinking of the colored magnetic particles during use of the magnetophoretic display panel, resulting in contamination of the dispersion medium received in the panel being prevented. This ensures that the display panel exhibits clear display over a long period of time.

Further, in the present invention, the white primary coat may be formed under the coloring layer, wherein the white primary coat is formed from a dispersion liquid constituted of titanium white, synthetic resin and water and sprayed in the form of mist-like droplets on each of the magnetic particle elements in the coating apparatus. This, when the coloring layer is made of a material reduced in brightness, prevents the coloring layer from being affected by a color of the magnetic particle elements, to thereby keep the coloring layer from being darkened or dull.

The invention will be understood more readily with reference to the following example; however, the example is intended to illustrate the invention and is not to be construed to limit the scope of the invention.

EXAMPLE

The following ingredients for colored magnetic particles were provided:

Magnetic particle elements: SUS 343L stainless steel (44 $\mu$m to 105 $\mu$m in particle diameter)
Synthetic resin: Acrylic emulsion resin (Aqueous dispersion liquid having a solid content of 40%)
Pigment: Prussian blue, titanium white.

7 wt % of titanium white and 1 wt % of synthetic resin were added to water and dispersed therein to prepare a first dispersion liquid having a solid content of 50%. Also, 7 wt % of Prussian blue and 3 wt % of synthetic resin were added to water and dispersed therein, to thereby prepare a second dispersion liquid having a solid content of 40%. Further, synthetic resin was added to water and dispersed therein to prepare a third dispersion liquid having a solid content of 30%. Then, SUS 343L powder for the magnetic particle elements was charged in the coating apparatus of a tumbling, fluidizing and granulating type and then the first dispersion liquid was sprayed in the form of mist-like droplets in the coating apparatus while fluidizing the SUS powder by means of hot air heated to a temperature of 75° C. and at a flow rate of 20 m$^3$/min. A rate of spraying of the first dispersion liquid and a flow rate of the air for spraying were suitably balanced with each other to permit the first dispersion liquid to be sprayed in the form of fine droplets, resulting in coating thereof on the magnetic particle elements being carried out. Then, all of the first dispersion liquid was coated on each of the magnetic particle elements to form a white primary coat thereon while controlling the rate of spraying of the first dispersion liquid to set a product temperature at 30 to 32° C. to ensure the coating at a temperature lower than a glass transition temperature of the resin in the emulsion. The above-described temperature was set within a range which permits the product to be suitably wetted and prevents peeling of a coloring layer from each of the magnetic particle elements and coalescence of the magnetic particle elements.

Then, the second dispersion liquid was sprayed in the form of mist-like droplets while fluidizing the SUS powder or magnetic particle elements under the same temperature and rate conditions as described above. In addition, all of the second dispersion liquid was coated on each of the magnetic particle elements to form a coloring layer thereon while controlling the rate of spraying of the second dispersion liquid to set a product temperature at 30 to 32° C.

Thereafter, the third dispersion liquid was sprayed in the form of mist-like droplets while fluidizing the SUS powder or magnetic particle elements under the same temperature and rate conditions as described above. In addition, all of the third dispersion liquid was coated on each of the magnetic particle elements to form a protective layer thereon while controlling the rate of spraying of the third dispersion liquid to set a product temperature at 30 to 32° C.

Subsequently, the magnetic particle elements thus treated were heated to a temperature of 50° C., to thereby evaporate water therefrom, resulting in blue colored magnetic particles of the present invention being obtained.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. Colored magnetic particles for magnetophoretic display which are contained in a plastic dispersion liquid for a magnetophoretic display panel, comprising:
   magnetic particle elements;
   a coloring layer formed on each of said magnetic particle elements from a first dispersion liquid;
   said first dispersion liquid being constituted of a coloring pigment, synthetic resin and water;

said synthetic resin being in the form of an aqueous emulsion; and a protective layer formed on said coloring layer, said protective layer being formed from a second dispersion liquid constituted of synthetic resin dispersed in water, wherein the colored magnetic particles contain magnetic particle elements of 75 to 77 wt %, coloring pigment of 13 to 14 wt % and synthetic resin of 9 to 10 wt %.

2. Colored magnetic particles as defined in claim 1, wherein each of the colored magnetic particles further comprises a white primary coat formed under said coloring layer;

said white primary coat being formed from a third dispersion liquid constituted of titanium white, synthetic resin and water.

3. Colored magnetic particles as defined in claim 1, wherein the colored magnetic particles have a saturation magnetization of 80 to 150 emu/g and a magnetization, in a magnetic field of 1 KOe, of 35 to 65 emu/g.

4. Colored magnetic particles as defined in claim 1, wherein 90 wt % or more of the colored magnetic particles have a particle diameter of 50 $\mu$m to 130 $\mu$m.

5. Colored magnetic particles as defined in claim 1, wherein said magnetic particle elements have an apparent density of 2.3 to 3.0 g/cm$^3$ and a saturation magnetization of 130 to 200 emu/g.

6. A method for manufacturing colored magnetic particles for magnetophoretic display which are contained in a plastic dispersion liquid for a magnetophoretic display panel, comprising the steps of:

forming a coloring layer on each of magnetic particle elements from a first dispersion liquid;

said first dispersion liquid being constituted of a coloring pigment, synthetic resin and water;

said synthetic resin being in the form of an aqueous emulsion; and forming a protective layer on said coloring layer, said protective layer being formed from a second dispersion liquid constituted of synthetic resin dispersed in water.

7. A method for manufacturing colored magnetic particles as defined in claim 6, further comprising the step of forming, prior to the forming step of said coloring layer, a white primary coat from a third dispersion liquid including a titanium white pigment, synthetic resin and water on each of the magnetic particle elements.

8. A method for manufacturing colored magnetic particles as defined in claim 7, wherein the forming of said coloring layer is carried out by spraying said first dispersion liquid in the form of mist-like droplets in said coating apparatus.

9. A method for manufacturing colored magnetic particles as defined in claim 8, wherein the forming of said white primary coat is carried out by spraying said third dispersion liquid in the form of mist-like droplets in said coating apparatus.

10. A method for manufacturing colored magnetic particles as defined in claim 7, wherein the forming of said protective layer is carried out by spraying said second dispersion liquid in the form of mist-like droplets in said coating apparatus.

11. A method for manufacturing colored magnetic particles as defined in claim 10, wherein the forming of said white primary coat is carried out by spraying said third dispersion liquid in the form of mist-like droplets in said coating apparatus.

12. A method for manufacturing colored magnetic particles as defined in claim 7, wherein the forming of said white primary coat is carried out by spraying said third dispersion liquid in the form of mist-like droplets in said coating apparatus.

13. A method for manufacturing colored magnetic particles as defined in claim 7, wherein said first dispersion liquid is coated on said magnetic particle elements at a product temperature lower than a glass-transition temperature of said synthetic resin.

14. A method for manufacturing colored magnetic particles as defined in claim 7, wherein said magnetic particle elements have an apparent density of 2.3 to 3.0 g/cm$^3$ and a saturation magnetization of 130 to 200 emu/g.

15. A method for manufacturing colored magnetic particles as defined in claim 7, wherein the pigment has a particle diameter of between 0.01 $\mu$m and 6 $\mu$m.

16. A method for manufacturing colored magnetic particles as defined in claim 6, wherein the forming of said coloring layer is carried out by spraying said first dispersion liquid in the form of mist-like droplets in said coating apparatus.

17. A method for manufacturing colored magnetic particles as defined in claim 16, wherein the forming of said protective layer is carried out by spraying said second dispersion liquid in the form of mist-like droplets in said coating apparatus.

18. A method for manufacturing colored magnetic particles as defined in claim 16, wherein said first dispersion liquid is coated on said magnetic particle elements at a product temperature lower than a glass-transition temperature of said synthetic resin.

19. A method for manufacturing colored magnetic particles as defined in claim 6, wherein the forming of said protective layer is carried out by spraying said second dispersion liquid in the form of mist-like droplets in said coating apparatus.

20. A method for manufacturing colored magnetic particles as defined in claim 6, wherein said first dispersion liquid is coated on said magnetic particle elements at a product temperature lower than a glass-transition temperature of said synthetic resin.

21. A method for manufacturing colored magnetic particles as defined in claim 6, wherein said magnetic particle elements have an apparent density of 2.3 to 3.0 g/cm$^3$ and a saturation magnetization of 130 to 200 emu/g.

22. A method for manufacturing colored magnetic particles as defined in claim 6, wherein the pigment has a particle diameter of between 0.01 $\mu$m and 6 $\mu$m.

23. A method for manufacturing colored magnetic particles as defined in claim 15 further comprising the step of providing magnetic particle elements having an apparent density of 2.3 to 3.0 g/cm$^3$ and providing a white base color layer on each of the magnetic particle elements;

said first dispersion liquid being constituted of a coloring pigment, synthetic resin and water;

said synthetic resin being in the form of an aqueous emulsion, the white base coloring layer is provided prior to the coloring layer and the coloring layer includes a non-white coloring pigment.

24. A magnetophoretic display for providing indicia upon application of a magnetic field comprising:

a housing having a display panel; a plurality of cells positioned within the housing and operatively contacting one side of the display panel;

a plurality of magnetic particle elements positioned within each cell;

a coloring layer formed on each of said magnetic particle elements from a first dispersion liquid to thereby color each of said magnetic particles;

said first dispersion liquid being constituted of a coloring pigment, synthetic resin and water;

said synthetic resin being in an aqueous emulsion; and a protective layer formed on said coloring layer, said protective layer being formed from a second dispersion liquid constituted of synthetic resin dispersed in water, wherein the colored magnetic particles contain magnetic particle elements of 75 to 77 wt %, coloring pigment of 13 to 14 wt % and synthetic resin of 9 to 10 wt %.

25. A magnetophoretic display for repetitively providing indicia upon each application of a magnetic field comprising:

a housing having a display panel;

a plurality of cells positioned within the housing and operatively contacting one side of the display panel;

a plurality of magnetic particle elements positioned within each cell;

a first coloring layer formed on each of said magnetic particle elements from a first dispersion liquid to thereby provide a base color for each of said magnetic particles;

said first dispersion liquid being constituted of a coloring white pigment, synthetic resin and water;

said synthetic resin being in an aqueous emulsion;

a second coloring layer formed on each of said magnetic particle elements from a second dispersion liquid to thereby provide an outer color for each of said magnetic particles;

said second dispersion liquid being constituted of a coloring non-white pigment, synthetic resin and water;

said synthetic resin being in an aqueous emulsion; and a protective layer formed on said coloring layer, said protective layer being formed from a third dispersion liquid constituted of synthetic resin dispersed in water wherein the colored magnetic particles contain magnetic particle elements of 75 to 77 wt %, coloring pigment of 13 to 14 wt % and synthetic resin of 9 to 10 wt % and a saturation magnetization of 130 to 200 emu/g.

26. The magnetophoretic display of claim 25, wherein the magnetic particle elements have an apparent density of 2.3 to 3.0 g/cm.

* * * * *